United States Patent
Knobel et al.

(10) Patent No.: US 9,830,394 B2
(45) Date of Patent: Nov. 28, 2017

(54) HELP SERVICE FOR IDENTIFYING RELEVANT RESOURCES ACROSS A COMMUNITY AND SOCIAL DATA STREAMS

(71) Applicant: HelpAround Inc., Wilmington, DE (US)

(72) Inventors: Yishai Knobel, Tel Aviv (IL); Shlomi Aflalo, Prades Hana-Karkur (IL)

(73) Assignee: HelpAround, Inc., Wilmington, DE (US)

(*) Notice: Subject to any disclaimer, the term of this patent is extended or adjusted under 35 U.S.C. 154(b) by 66 days.

(21) Appl. No.: 14/266,716

(22) Filed: Apr. 30, 2014

(65) Prior Publication Data

US 2014/0330842 A1 Nov. 6, 2014

Related U.S. Application Data

(60) Provisional application No. 61/817,887, filed on May 1, 2013.

(51) Int. Cl.
*G06F 17/20* (2006.01)
*G06F 17/30* (2006.01)

(52) U.S. Cl.
CPC ............................ *G06F 17/3087* (2013.01)

(58) Field of Classification Search
USPC ................................................ 707/706, 748
See application file for complete search history.

(56) References Cited

U.S. PATENT DOCUMENTS

| | | | | |
|---|---|---|---|---|
| 8,341,024 B2* | 12/2012 | Bantz | .................. | G06Q 30/016 705/26.1 |
| 8,831,634 B2* | 9/2014 | Wang | ..................... | H04W 4/02 455/404.1 |
| 8,965,508 B2* | 2/2015 | Matos | .................. | A61N 1/3727 607/30 |

(Continued)

OTHER PUBLICATIONS

Mahmud, Nasim et al.; "Geo-social interaction: context-aware help in large scale public spaces"; Ambient Intelligence; 2010; pp. 107-116 [online], [retrieved on Aug. 20, 2014]. Retrieved from the Internet: <URL: http://davy.preuveneers.be/publications/ami10.pdf>.

*Primary Examiner* — Kim Nguyen
(74) *Attorney, Agent, or Firm* — North Shore Patents, P.C.; Michele Liu Baillie

(57) ABSTRACT

In providing a help service, a server: receives a help request from a help seeker; matches the help request to potential helpers using a scoring model; sends a list of potential helpers to the help seeker; receives selections of potential helpers; sends the help request to each selected potential helper; receives from potential helper indication of willingness to respond to the help request; and sends to the help seeker information on the potential helpers. The server may further: search an external platform for posts seeking help; import the post to the help service; and send a response from potential helpers to post on the platform. The server may further: analyze keywords in the help request; determine it a candidate for sponsored answers; routes the help request to specialists; receives answers from specialists; and sends the answers to the help seeker. The server may further provide a safety net strength score.

22 Claims, 8 Drawing Sheets

(56) References Cited

U.S. PATENT DOCUMENTS

| | | | |
|---|---|---|---|
| 9,002,837 B2* | 4/2015 | Brandstetter | G06F 17/30864 707/723 |
| 9,185,342 B2* | 11/2015 | Isaacs | H04L 67/20 |
| 2009/0299853 A1 | 12/2009 | Jones et al. | |
| 2011/0238763 A1 | 9/2011 | Shin et al. | |
| 2012/0253831 A1 | 10/2012 | John et al. | |
| 2012/0271883 A1 | 10/2012 | Montoya et al. | |

* cited by examiner

HELP SERVICE FOR IDENTIFYING RELEVANT RESOURCES ACROSS A COMMUNITY AND SOCIAL DATA STREAMS

CROSS-REFERENCE TO RELATED APPLICATIONS

The present applications claims priority to U.S. provisional patent application Ser. No. 61/817,887, filed on May 1, 2013.

BACKGROUND OF THE INVENTION

In conventional Local Search systems, users who are looking for items or services nearby are able to search only for businesses. For example, conventional systems allow a user to search for a pharmacy nearby if they are suffering from a headache and need a painkiller. However, conventional systems are only able to find items or services that are offered by businesses. Typically, these systems do not provide a way to find other people (rather than businesses), who might be willing and able to provide such item or service, often for free. Therefore, a user seeking to find another person nearby who can lend a phone charger or a pill of Aspirin is unable to do so using existing solutions.

Existing approaches to this problem include use of local search services and help forums on social networks. However, some shortcomings of these approaches include: difficulty in finding individuals who might be able to help as opposed to businesses; unable to borrow items rather than buying; difficult to direct the request only to people who are likely to be able to help, nearby, or willing to help with a specific request; difficult to reach potential helpers on the same social network but who are not directly connected; difficult to reach potential helpers on a different social network; and difficult to direct the request to the relevant specialists able to help, nearby, or willing to help with a specific request.

BRIEF SUMMARY OF THE INVENTION

According to one embodiment of the present invention, a help service is provided by a server. The server receives a help request from a help seeker client device. Based on information in the help request, the server matches the help request to one or more potential helpers using a scoring model. The server then sends the help request to each potential helper client device. The server receives from one or more potential helper client devices, an indication of willingness to respond to the help request, and sends to the help seeker client device information for connecting to the one or more potential helper client devices.

In one aspect of the present invention, a list of potential helpers is then sent to the help seeker client device. The server receives from the help seeker client device, a selection of one or more of the potential helpers on the list. The server then sends the help request to each selected potential helper client device.

In one aspect of the present invention, in matching the help request to one or more potential helpers, a composite score is calculated for each given potential helper according to the scoring model. The scoring model comprises a weighted availability score representing the given potential helper's ability to help, a weighted helpfulness score representing the given potential helper's potential level of helpfulness, a frequency score representing a frequency at which the given potential helper has responded to help requests, and a cost score representing estimated costs associated with obtaining help from the given potential helper. The list of potential helpers is created according to the composite score of each given potential helper.

In one aspect of the present invention, the availability score is weighted by one or more of the following: distance between the help seeker client device's current location and a given potential helper client device's current location; a time of day; a given potential helper's preferred geographical distance; degrees of separation between the given potential helper and the help seeker; response to previous help requests to the help seeker client device by the given potential helper; and ranking of the given potential helper by other users of the help service.

In one aspect of the present invention, the helpfulness score is weighted by one or more of the following: a given potential helper profile; types of requests the given potential helper previously responded to; and satisfaction levels of past help seekers.

In one aspect of the present invention, the server searches a platform external to the help service for posts seeking help. Upon finding a post seeking help, the server imports the post to the help service, creates a help request within the help service, and associates the help request with the imported post. When the server receives from one or more potential helper client devices, a response to the help request, the server sends the response to the help request to the post on the platform.

In one aspect of the present invention, the server analyzes the text of the help request, determines that the help request is a candidate for a sponsored answer, determines a request type for the help request, and matches the request type with one or more specialists. The server routes the help request to one or more specialist client devices. When the server receives one or more answers to the help request from the one or more specialist client devices, the one or more answers are sent to the help seeker client device.

In one aspect of the present invention, a safety net strength is provided. A server obtains a current location of a client device and identifies one or more healthcare related resources within a predetermined distance of the current location. The server calculates an availability score, a helpfulness score, and a cost score of reach resource using a scoring model. The availability score, the helpfulness score, and the cost score are combined to determine a safety net strength score. The safety net strength score is then displayed on the client device.

System and computer program products corresponding to the above-summarized methods are also described and claimed herein.

DETAILED DESCRIPTION OF THE INVENTION

Figure 1:
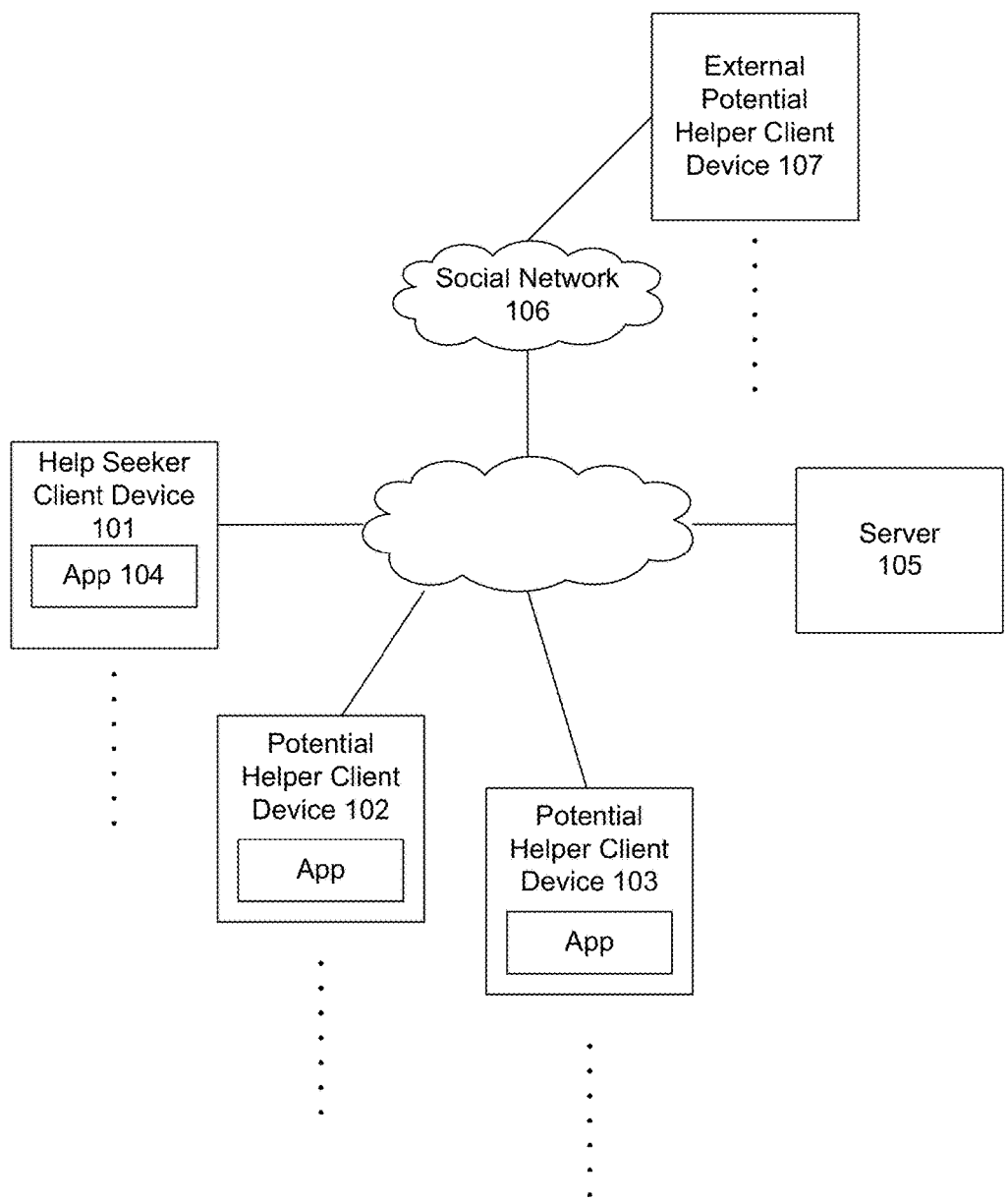
FIG. 1 illustrates a system for providing a help service according to embodiments of the present invention.

The following description is presented to enable one of ordinary skill in the art to make and use the present invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention can take the form of an entirely hardware embodiment, an entirely software embodiment or an embodiment containing both hardware and software elements. In a preferred embodiment, the present invention is implemented in software, which includes but is not limited to firmware, resident software, microcode, etc.

Furthermore, the present invention can take the form of a computer program product accessible from a computer usable or compute readable storage medium providing program code for use by or in connection with a computer or any instruction execution system. For the purposes of this description, a computer usable or computer readable storage medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, point devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIG. 1 illustrates a system for providing a help service according to embodiments of the present invention. The system includes one or more client devices 101-103, such as a mobile device, having network communication capabilities. Each client device 101-103 includes an application (or "app") 104 which, in concert with a server 105, provides a help service according to embodiments of the present invention. A user ("help seeker") may seek help through the app 104 on the client device 101 by sending a help request to the server 105. Other persons or businesses that may be able to provide help ("potential helper") may be notified of the help request by the server 105 through the app 102 on their respective client devices 102-103. As described herein, the help service may include the capability to import and export content from one or more social networks 104 and for seeking help from potential helper client devices 107 external to the help service.

Figure 2:
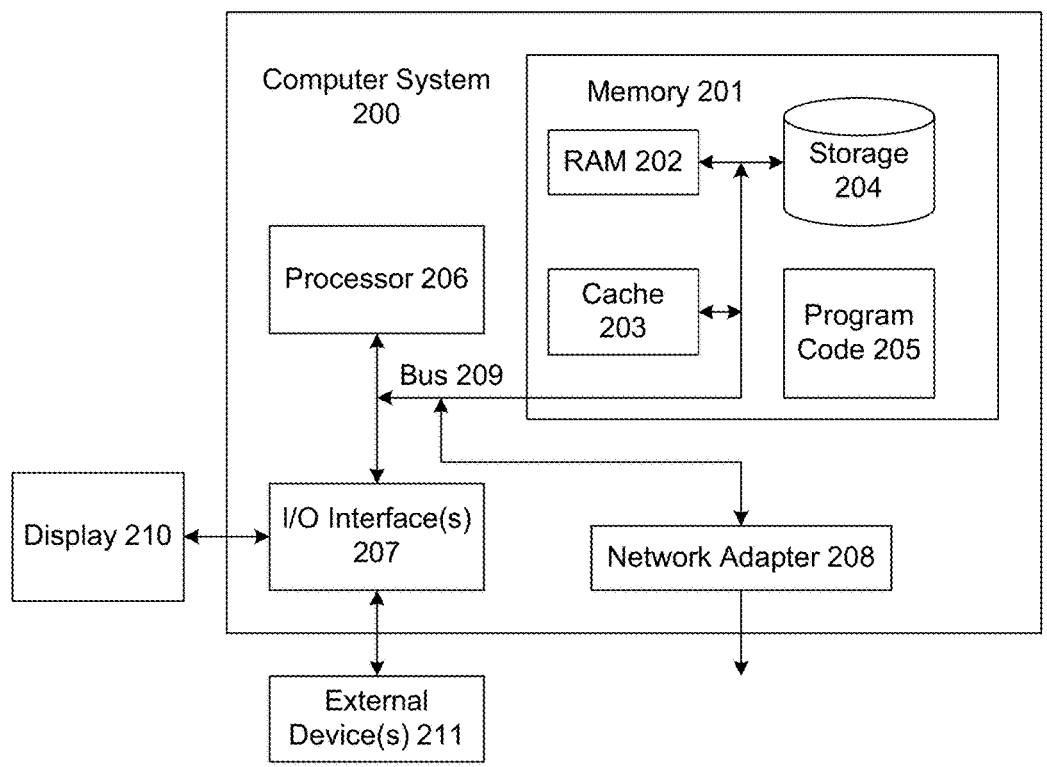
FIG. 2 illustrates a computer system according to embodiments of the present invention.

Each client device 101-103, 107 and the server 105 may comprise a computer system, as illustrated in FIG. 2. The computer system 200 is operationally coupled to a processor or processing units 206, a memory 201, and a bus 209 that couples various system components, including the memory 201 to the processor 206. The bus 209 represents one or more of any of several types of bus structure, including a memory bus or memory controller, a peripheral bus, an accelerated graphics port, and a processor or local bus using any of a variety of bus architectures. The memory 201 may include computer readable media in the form of volatile memory, such as random access memory (RAM) 202 or cache memory 203, or non-volatile storage media 204. The memory 201 may include at least one program product having a set of at least one program code module 205 that are configured to carry out the functions of embodiment of the present invention when executed by the processor 206. The computer system 200 may also communicate with one or more external devices 211, such as a display 110, via I/O interfaces 207. The computer system 200 may communicate with one or more networks via network adapter 208.

Figure 3:
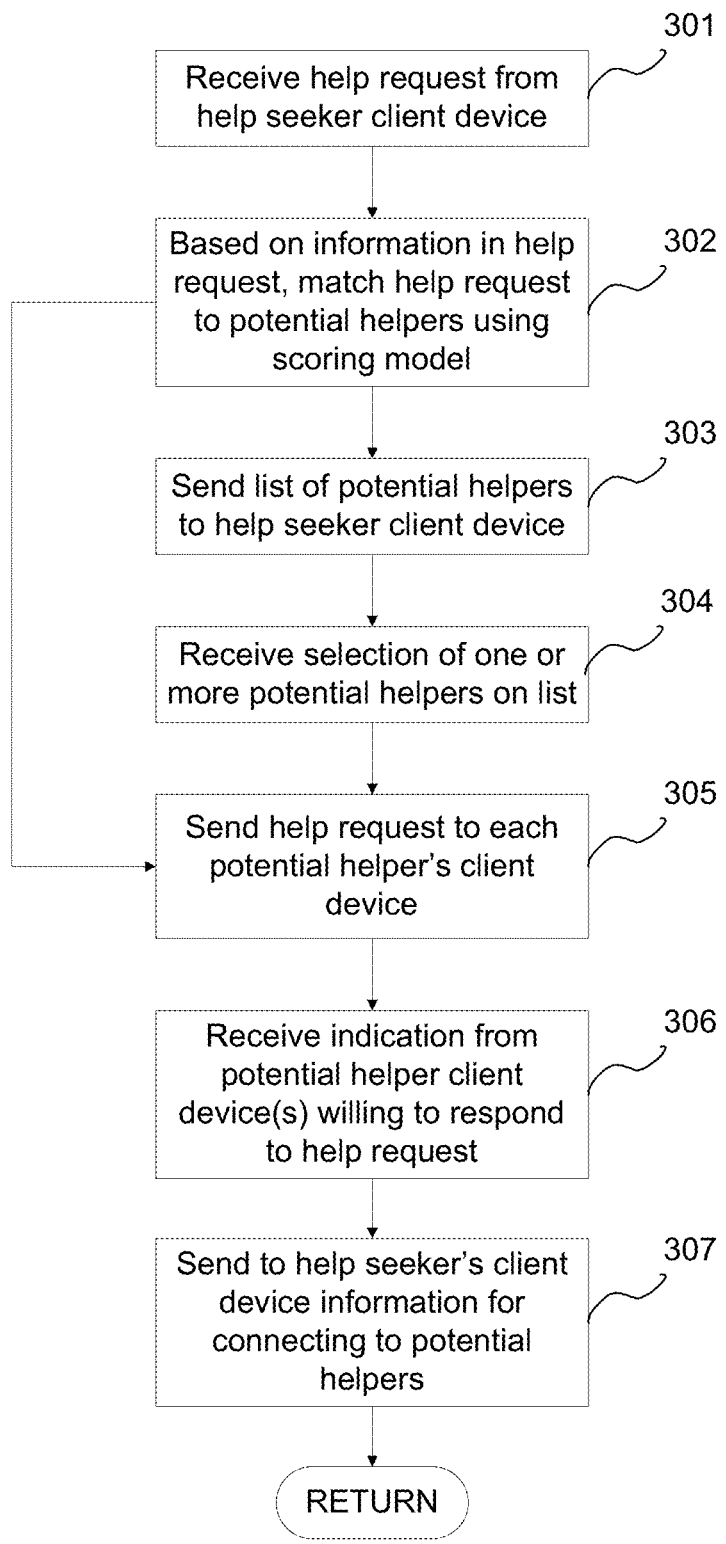
FIG. 3 is a flowchart illustrating a method for providing a help service according to embodiments of the present invention.

FIG. 3 is a flowchart illustrating a method for providing a help service according to embodiments of the present invention. In this embodiment, a help seeker registers with the help service by creating an account through the app 104. The server 105 receives a help request from the help seeker's client device 101 via the app 104 (301). The help request may include the content of the request, a unique identifier for the help seeker, and the current location of the help seeker's client device 101. The help seeker's location may be obtained from the network to which his or her client device 101 is connected, from the client device's GPS unit, or by some other appropriate mechanism. Based on the information in the help request, the server 105 matches the help request to one or more potential helpers using a scoring model (302). In this embodiment, the scoring model is an equation with a set of coefficients and a set of variables. The scoring model is described further below. The server sends the help request to the app on the potential helper client device (305). The server 105 sends the help request to the app on the client device of each selected potential helper (305). The server 105 then receives an indication from each potential helper's client device that is willing to response to the help request (306). The server 105 sends to the app 104 on the help seeker's client device 101 the information for connecting with the potential helpers (307). Optionally, the server 105 then sends a list of matching potential helpers to the app 104 on the help seeker's client device 101 (303). In this embodiment the app 104 receives relevant information for each potential helper, such as profile information, number of mutual connections in applicable social network(s), etc. The app 104 displays the list to the help seeker, who may then review the information and select one or more potential helpers. The app 104 then sends, and the server 105 receives, the selected potential helpers (304). Upon receiving the selections, the server 105 sends the help request to the app on the client device of each selected potential helper (305). For example, the help seeker's client device 101 may receive a link via a push notification that will bring the help seeker to a group chat screen within the app 104, in which the help seeker may chat with each of the responding potential helpers.

Alternatively or in addition, the help seeker's help request is posted onto a forum accessible by other users registered with the help service. Potential helpers may browse posted help requests on the forum and respond to help seekers directly.

In one embodiment, the scoring model is used to calculate a composite score. The variables used by the scoring model include, but are not limited to, the following: availability, helpfulness, frequency, and cost. The availability score represents a potential helper's availability to provide help. In this example, the availability score may be the distance between the help seeker's current location and the potential helper's location. The availability score may then be weighted by other factors, such as: the time of day (e.g., the potential helper responds only after work hours); the potential helper's preferred geographical distance (e.g. the potential helper agrees to help only if a requesting user is within 500 feet); degrees of separation (e.g., the potential helper historically only responded to first or second degree connections); response to previous help requests to this help seeker by the potential helper; and ranking of the potential helper by other users of the help service. The helpfulness score represents the potential helper's estimated level of helpfulness with a specific request. In this example, the helpfulness score may be the potential helper's preferred types of help (e.g. the potential helper responds only to health issues related to diabetes) (e.g. the help request is specific to the help seeker's gender and the potential helper is of the opposite gender—the helpfulness score here would be low) and may then be weighted by other factors, such as: the potential helper's profile (e.g. demographics, interests, and skills); the types of requests the potential helper previously responded to; and the satisfaction level of past help seekers (obtained via feedback directly to the server 105, subsequent messages posted by requesting user concerning the helper, ratings, etc.). The frequency score represents how often the potential helper has responded to help requests. The cost score represents the estimated costs associated with obtaining help from this specific potential helper (e.g. associated charges, travel time, etc.).

Optionally, in determining matches, the server 105 may include persons and business in the help service community and/or persons and businesses external to the help service community but whose information is publicly available. For example, publicly available information on persons and businesses on a social network 106 may be crawled using the social network's API in order to identify potential helpers external to the help service community that match the help request. The server 105 may then contact these potential helpers' client devices 107 concerning the help request via the same social network platform 106 where they were found. If one of these potential helper client devices indicates a willingness to respond to the help request, then the server 105 notifies the help seeker's client device 101 of the response from this potential helper client device 107 in the same manner as set forth above.

For example, consider the following scenario. Robert takes his younger son, Justin, who has type-1 diabetes, to a hockey game at an arena seating more than 21,000 fans. Upon arriving at their seats, his son realized that he had forgotten to bring his diabetes supply bag with his meter, lancing device, glucose tabs, and emergency glucagon. Robert is unable to leave the arena and drive back home (too far) or head over to the nearest pharmacy (also far and likely costly). However, Robert has a smartphone with the help service app 104. Robert uses this app 104 to locate someone in the arena with diabetes who is willing to help, if necessary, with supplies. Robert sends a help request (301), describing Justin's condition and his immediate needs. The server 105 receives Robert's help request, his unique identifier, and the current location of his smartphone. Based on this information, the server 105 matches Robert's help request with other persons within the arena who may be able to help, using the scoring model as described above (302). Assume that Jane also has a child with type-1 diabetes and is also attending the game. Robert's help request is matched with Jane. The server 105 sends Robert's help request to Jane's smartphone (305). Jane decides to help Robert and Justin and responds accordingly. The server 105 receives Jane's response (306) and sends a push notification to Robert's smartphone with information for connecting with Jane (307). Robert may then arrange with Jane to borrow some of Jane's supplies. Optionally, the server 105 includes Jane's information in the list of potential helpers sent to Robert's smartphone (303). Robert reviews Jane's information and selects her to help. The server 105 receives Robert's selection of Jane (304) and sends Robert's help request to Jane's smartphone (305). Jane decides to help Robert and Justin and responds accordingly. The server 105 receives Jane's response (306) and sends a push notification to Robert's smartphone with information for connecting with Jane (307). Assume also that a clinic offering emergency medical services is located within the arena. The server 105 also matches Robert's help request with the clinic (302) and includes the clinic in list of potential helpers sent to Robert's smartphone (303). Robert reviews the information on the clinic and may select the clinic. The server 105 receives Robert's selection of the clinic (304) and sends Robert's help request to the clinic (305). A clinic representative determines that it has the needed medical supplies in stock and sends an indication to the server 105 that it can respond to Robert's help request. The server 105 receives the response from the clinic (306) and sends a push notification to Robert's smartphone with information for connecting with the clinic (307). Robert may then arrange to visit the clinic to pick up the needed medical supplies.

Optionally, the server 105 may also crawl existing data sources, such as social networks 106, to identify potential helpers that are not part of the help service community for inclusion in the list of potential helpers. In the example with Robert above, assume that a spectator attending the same game publicly tweets during the game. Using the standard API offered by Twitter™, the server 105 searches the platform for users who are also in the arena and finds the spectator. The server 105 obtains the spectator's profile, tweet history, and any other publicly available information and determines that the spectator is likely to be able to help with diabetes supplies. The server 105 then includes the spectator in the list of potential helpers sent to Robert.

The help service according to embodiments of the present invention may be used for persons with chronic conditions, such as diabetes, arthritis, and other illnesses. Persons with such chronic conditions may experience feelings of isolation, loneliness, and the fear of being without their medication or necessary supplies. In addition to providing the ability to request help from potential helpers, as described above, the present invention may further provide a safety net strength score to a user. The server 105 calculates a safety net strength score for each client device 101, which represents the availability, usefulness and cost effectiveness of nearby potential helpers and services at the current time. The safety net strength score gives the user a quantified measurement of their safety level and allows the user to act to increase it. Actions may include adding helpers to the safety net (e.g. by inviting more friends and family to the help service community), moving to an area with more healthcare services, designating one's emergency contacts within the app, filling out health-related information as part of the user's profile (e.g. medication information, allergic reactions, emergency contacts, emergency care details (blood type, drug sensitivities, allergies, etc.). In one embodiment, the safety net strength score is a single number representing the combined availability, past helpfulness, and utilization costs of each resource (people and services) available for the user at their current location. The psychological impact may be substantial, as the anxiety associated with living with a chronic condition is replaced by an actionable score that one can influence.

Figure 4:
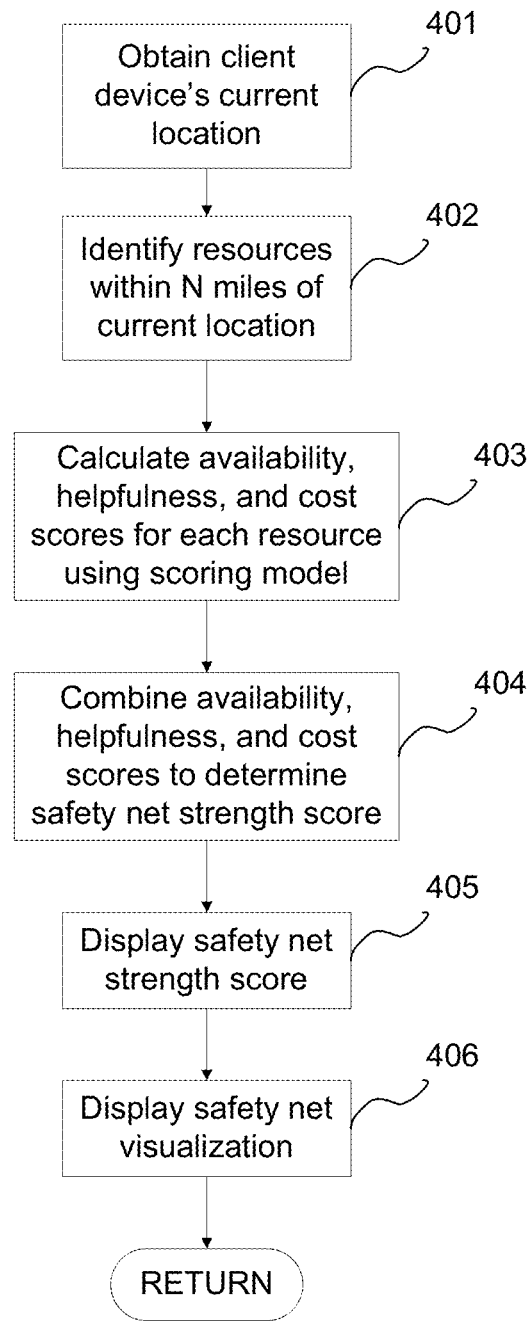
FIG. 4 is a flowchart illustrating a method for providing a safety net strength score according to embodiments of the present invention.
Figure 5:
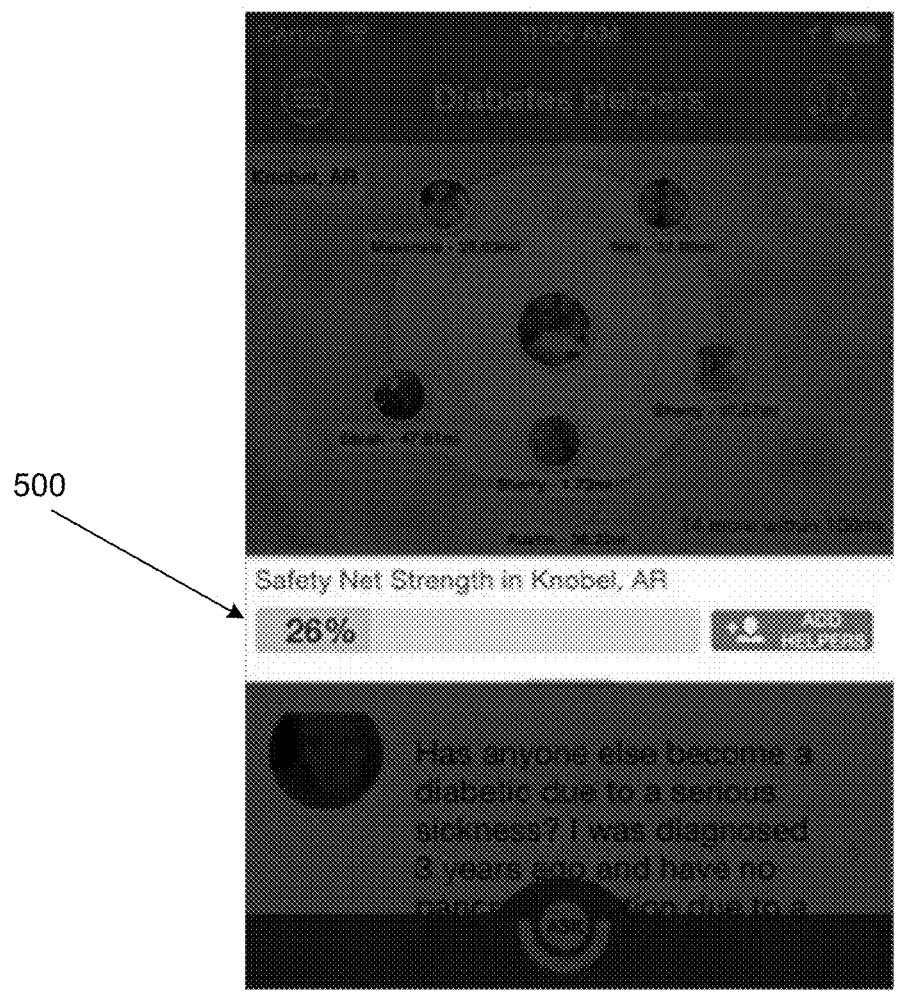
FIG. 5 illustrates an example display of the safety net strength score 500 according to embodiments of the present invention.
Figure 6:
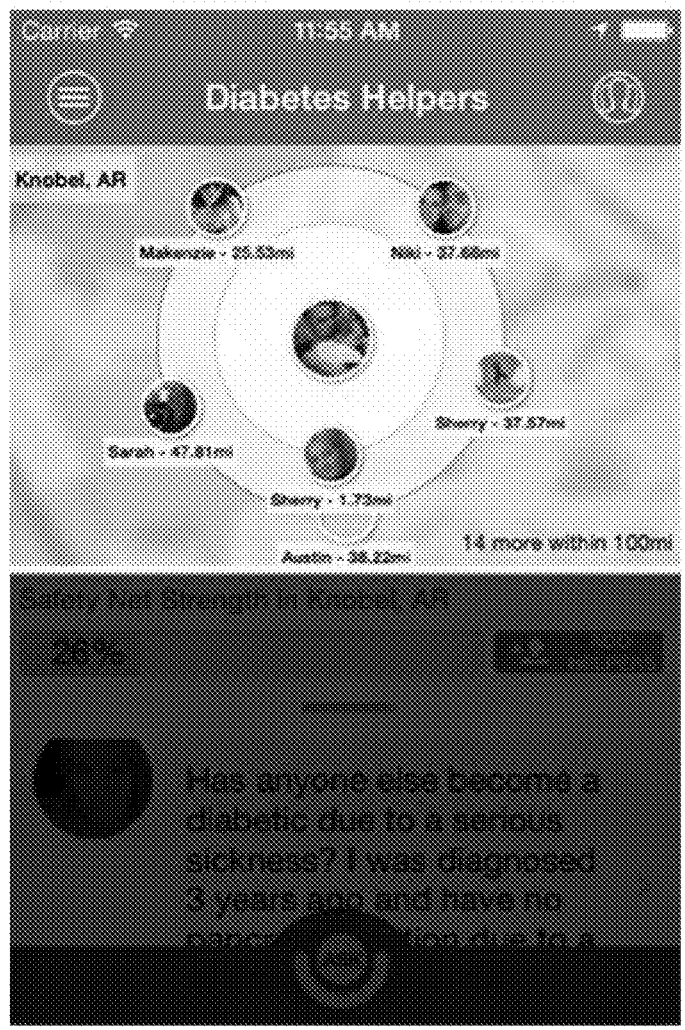
FIG. 6 illustrates an example safety net visualization according to embodiments of the present invention.

FIG. 4 is a flowchart illustrating a method for providing a safety net strength score according to embodiments of the present invention. In this embodiment, the safety net strength score is calculated each time a user launches or resumes the app 104. The app 104 requests a safety net strength score for its current location from the server 105. To calculate the safety net strength score, the server 105 obtains the client device's current location (401). Here, the current location of the user's client device 101 is assumed to be the user's current location. The server 105 then identifies the resources available within N miles of the current location (402). Here, N is a parameter with a default value but is tunable by the user. For each resource identified, the server 105 calculates the availability, helpfulness, and cost scores using a scoring model (403), such as that described above. Here, the cost score may include the cost of utilizing a resource. For example, if an emergency room is nearby but the user is uninsured, then the cost score may be lower since the cost of using this resource would be high. Optionally, when the number of identified resources is large, the server 105 may calculate the scores only for the M resources closest to the current location. The server 105 may further weigh these scores by one or more additional factors, such as: a density of nearby users by distances (e.g. less than 2 miles, 2-50 miles, and more than 50 miles); a density of nearby healthcare professionals and/or clinics; for each resources, how recently the services has received their client device's location (e.g. apply X weight factor when location registered less than 5 hours ago, apply Y weight factor when location registered between 5-12 hours ago, apply Z weight factor when location registered between 12-24 hours ago, etc.); and the completeness of the user's profile (e.g. designation of emergency contacts, listing of allergies, listing of medications, etc.). The server 105 next combines the availability, helpfulness, and cost scores to determine a safety net strength score (404), which is then displayed by the app 104 (405). Other factors that may be considered in calculating the safety net strength score includes, but are not limited to: the history of help requests from the user (e.g. if the user posted a help request in the past when he/she was in a specific area, the user may be more likely to require help when in this area again); integration of the user's calendar (e.g. the user dining at a restaurant known to be a non-diabetes friendly establishment may lower the safety net strength score, while dining at a restaurant known to offer diabetes friendly options may raise the safety net strength score); and environmental factors specific to the user's location (e.g. the safety net strength score may be lowered due to hot weather which may cause dehydration and increase blood glucose level, high pollution level which may trigger an asthma attack, or high pollen count which may cause an allergic reaction). FIG. 5 illustrates an example display of the safety net strength score 500 according to embodiments of the present invention. Optionally, the app 104 may also display a visualization of the safety net (406), as illustrated in FIG. 6. Here, the safety net visualization includes graphic representations of the density of helpers, i.e., circles overlaid on a map, illustrating distances from the user with identified resources within each circle.

Optionally, in determining the safety net and the safety net strength score, the server 105 may crawl existing data sources, such as social networks 106, to identify potential resources and their approximate locations that are not part of the help service community. These resources may also be considered in calculating the safety net strength score and included in the safety net visualization. By including such resources, greater value and a greater sense of safety may be provided to the user. For example, for a diabetic user in a rural or remote location, there may be very few nearby resources within the help service community. The present invention would then display to this user the potential resources outside the help service community, increasing the value of the service to this user.

In the Robert and Justin example set forth above, the safety net visualization would show to Robert other people in the stadium who are outside of the help service community who may be able to help. Robert may then invite these potential helpers to join the help service community, thus strengthening the community. For example, assume that the server 105 identifies a diabetic user on Twitter™ who is in the arena but who is not registered with the help service. This diabetic user may be included in the list of potential helpers given to Robert. If Robert selects this diabetic user, the server 105 would send a notification to the diabetic user through Twitter™, the social network platform from which the diabetic user was identified with a link for signing up. The diabetic user may click on this link and follow the steps to join the service. For example, the Twitter™ user sees a tweet from the help service which informs him that a help service user has replied to the question and includes a link to a help service web page external to Twitter™. The web page displays to the Twitter™ user the help request and response, and allows the Twitter™ user to sign into the help service to reply to the helpers. The web page may also invite the Twitter™ user to register with the help service.

Figure 7:
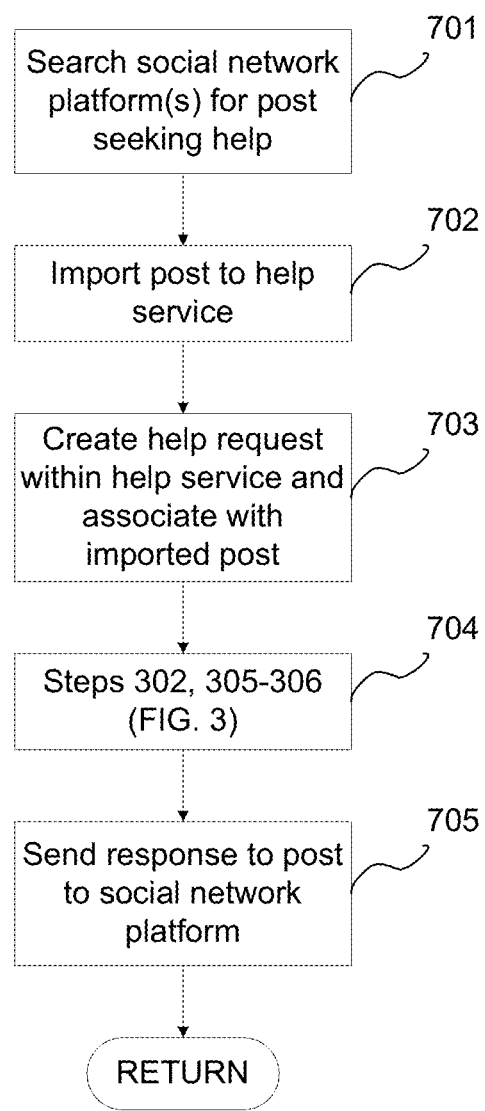
FIG. 7 is a flowchart illustrating a method for providing the help service to external platforms according to embodiments of the present invention.

In another embodiment of the present invention, help requests posted on platforms outside of the help service community may also be serviced by the help service. FIG. 7 is a flowchart illustrating a method for providing the help service to external platforms according to embodiments of the present invention. The server 105 uses the API offered by the social network to interface with the social network. The server 105 searches the social network platform(s) 106 for posts seeking help (701). In this embodiment, the server 105 searches postings on the social network for certain keywords and imports postings containing the keywords to the help service (702). As part of the import process, the server 105 stores a unique ID associated with each imported posting. Any available information on the poster is also imported and stored. The server 105 creates a help request within the help service and associates it with the imported post (703). The server 105 then matches the help request to a list of potential helpers in the same manner described above and illustrated in steps 302, 305, and 306 of FIG. 3 (704). Upon receiving a response from one or more potential helpers, the server 105 sends a response to the original post on the social network platform 106 (705).

For example, the server 105, using the standard API provided by Twitter™, searches publicly available Twitter™ posts for the keywords related to diabetes and for hashtags that contain terms related to diabetes (e.g. "diabetes", "T1", "T2", "insulin", "blood sugar", etc.) (701). Upon identifying a tweet by a particular user and determining that it likely contains a help request, the server 105 imports the tweet to the help service, along with the tweet ID and any other relevant information (702). The server 105 creates a help request within the help service and associates this help request with the tweet ID (703). The help request is then matched with potential helpers per 302-306 of FIG. 3 (704). Upon receiving a response from a potential helper, the server 105 posts the response to the original tweet, identified using the tween ID (705). Here, the help service would have a Twitter™ account from which the response may be posted. Further, when the potential helper is a business entity, information on the business entity may be included in the response, thus giving the business entity visibility and increased exposure to potential business opportunities.

Figure 8:
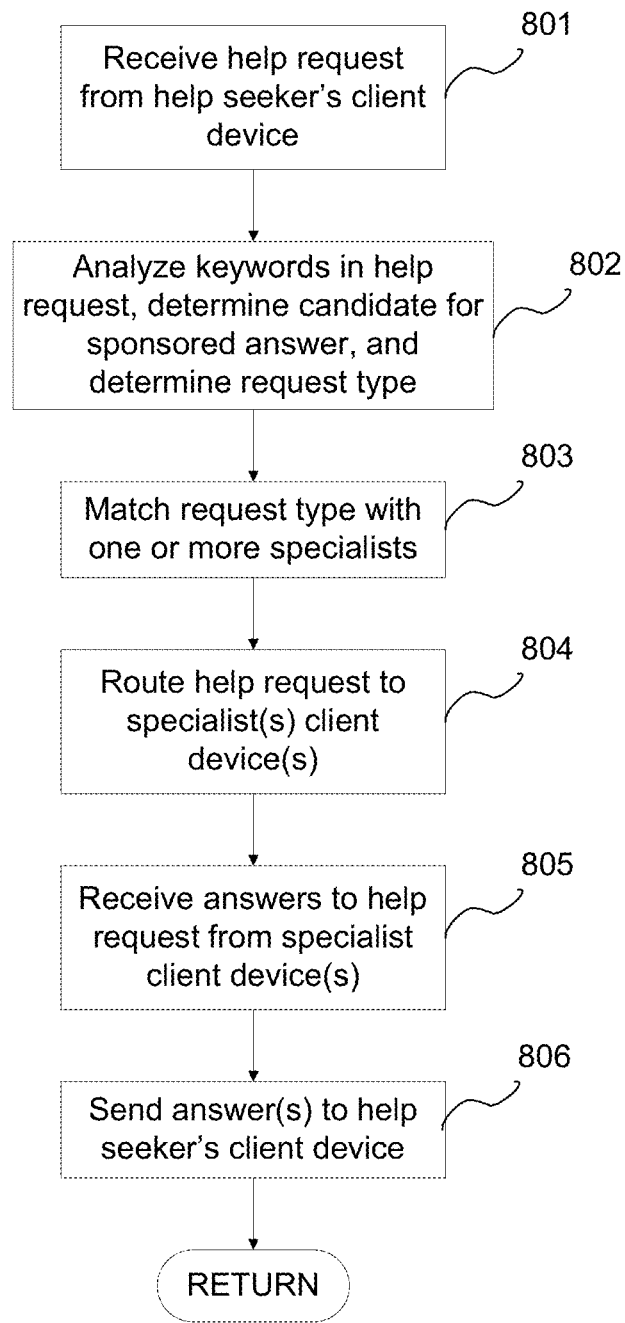
FIG. 8 is a flowchart illustrating a method for providing sponsored answers to help requests according to embodiments of the present invention.

To increase the value of the help service to help seekers, the help service further offers "sponsored" answers to help requests from professionals who are specialists in the help request's subject matter. FIG. 8 is a flowchart illustrating a method for providing sponsored answers to help requests according to embodiments of the present invention. The server 105 receives a help request from a help seeker's client device 101 via the app 104 (801). The server 105 analyzes the text of the help request, determines that it qualifies as a candidate for a sponsored answer, and determines the request type (802). In this embodiment, this analysis is based on keywords or natural language. For example, help request that seek emotional support but does not include a question or request are less appropriate for a sponsored answer from a pharmacist but may be relevant for a sponsored answer from a psychologist or a social worker. The server 105 then matches the request type with one or more specialists (803). The help request is then routed to each specialist's client device (804). The matching of the help request to the specialists may be performed using the scoring model as that described above. The server 105 may then receive answer(s) to the help request from the client devices of one of more of the specialists (805). The server 105 then sends the answers to the help seeker's client device 101 via the app 104 (806).

For example, assume a help seeker's help request contains questions about symptoms and side effects of a particular medication. The server 105 receives this help request from the help seeker's client device 101 via the app 104 (801). The server 105 analyzes the keywords in the help request, determines that it qualifies as a candidate for a sponsored answer, and determines the request type (802). The server 105 matches the request type with a pharmacist located within N miles of the help seeker (803) and routes the questions in the help request to the client device of the pharmacist (804). The server 105 receives answers to the questions from the pharmacist's client device (805). The server 105 sends the answers from the pharmacist to the help seeker's client device 101 via the app 104 (806). The pharmacist may be identified in the answers sent to the help seeker's client device 101, which may include the pharmacist's contact information. Unlike advertising platforms, the help service does not provide advertisement relevant to the questions. Rather, the help service provides the actual answers to the questions from a qualified professional. Further, the responding professional is matched based partly on the proximity of the professional to the help seeker, increasing the level of engagement in the local community and provides nearby professionals the ability to provide their expertise within their community.

In addition to providing sponsored answers, the server 105 may also categorize a help request as seeking emotional support. The help request then becomes a candidate for sponsored gestures, such as a virtual hug, virtual gifts, etc. The help request is then displayed in the app or sent as a push notification via the app to users who might potentially react by sending a sponsored gesture. When the help seeker's help request is posted onto the forum accessible by other users registered with the help service, other users may browse posted help requests on the forum and respond by purchasing and/or gifting a sponsored gesture to the help seeker. Such mechanisms increase the experience of community for the help seeker and other users of the help service.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing a help service, comprising:
(a) receiving, by a server, a help request from a help seeker client device, wherein the help seeker initiates the help request, wherein the help request is associated with a medical condition, and wherein the help request is related to a medical need and at least one of a) a demographic, b) a context, and c) a behavior;
(b) based on information in the help request, matching, by the server, the help request to one or more potential helpers of the help request using a scoring model, wherein the one or more potential helpers is comprised of peers of the help seeker who are associated with a similar medical condition as the medical condition that prompted the help seeker's help request;
(c) sending, by the server, the help request to each potential helper client device;
(d) receiving, by the server from one or more potential helper client devices, an indication of willingness to respond to the help request; and
(e) sending, by the server to the help seeker client device, information for connecting to the one or more potential helper client devices from which the indication of willingness was received, to resolve the help request in a time frame required by the help seeker.

2. The method of claim 1, wherein the sending (c) comprises:
(c1) sending a list of potential helpers to the help seeker client device;
(c2) receiving, by the server from the help seeker client device, a selection of one or more of the potential helpers on the list.

3. The method of claim 1, wherein the matching (b) comprises:
(b1) for each given potential helper, calculating a composite score according to the scoring model, wherein the scoring model comprises a weighted availability score representing the given potential helper's ability to help and a weighted helpfulness score representing the given potential helper's potential level of helpfulness; and
(b2) creating the list of potential helpers according to the composite score of each given potential helper.

4. The method of claim 3, wherein the availability score is weighted by one or more of:
responses to previous help requests to the help seeker client device by the given potential helper; and
ranking of the given potential helper by other users of the help service, wherein the helpfulness score is weighted by one or more of types of requests the given potential helper previously responded to and satisfaction levels of past help seekers.

5. The method of claim 3, wherein the availability score is further weighted by one or more of a distance between the help seeker client device's current location, a given potential helper client device's current location, and a time of day, wherein the helpfulness score is further weighted by:
a given potential helper profile.

6. The method of claim 3, wherein the scoring model further comprises a frequency score representing a frequency at which the given potential helper has responded to help requests, and a cost score representing estimated costs associated with obtaining help from the given potential helper.

7. The method of claim 1, wherein the receiving (a) comprises:
(a1) searching, by the server, a platform external to the help service for posts seeking help;
(a2) upon finding a post seeking help, importing, by the server, the post to the help service; and
(a3) creating, by the server, a second help request within the help service and associate the second help request with the imported post;
wherein the receiving (d) further comprises:
(d1) receiving, by the server from one or more potential helper client devices, a response to the second help request;
wherein the sending (e) comprises:
(e1) sending, by the server, the response to the second help request to the post on the platform.

8. The method of claim 1, wherein the matching (b) comprises:
(b1) analyzing, by the server, text of the help request;
(b2) determining, by the server, that the help request is a candidate for a sponsored answer;
(b3) determining, by the server, a request type for the help request; and
(b4) matching, by the server, the request type with one or more specialists;
wherein the method further comprises:
(f) routing, by the server, the help request to one or more specialist client devices;
(g) receiving, by the server, one or more answers to the help request from the one or more specialist client devices; and
(h) sending, by the server, the one or more answers to the help seeker client device.

9. The method of claim 1 wherein the scoring model matches the one or more potential helpers based on at least one behavior associated with the one or more potential helpers, wherein the at least one behavior enables the one or more potential helpers to assist the help seeker with the help request.

10. A non-transitory computer readable medium comprising computer readable program code embodied therein, wherein when executed by a processor causes the processor to:
(a) receive a help request from a help seeker client device, wherein the help seeker initiates the help request, wherein the help request is associated with a medical condition, and wherein the help request is related to a medical need and at least one of a) a demographic, b) a context, and c) a behavior;
(b) based on information in the help request, match the help request to one or more potential helpers of the help request using a scoring model, wherein the one or more potential helpers is comprised of peers of the help seeker who are associated with a similar medical condition as the medical condition that prompted the help seeker's help request;
(c) send the help request to each potential helper client device;
(d) receive server from one or more potential helper client devices, an indication of willingness to respond to the help request; and
(e) send to the help seeker client device information for responding to the one or more potential helper client devices from which the indication of willingness was received, to resolve the help request in a time frame required by the help seeker.

11. The medium of claim 10, wherein the send (c) comprises:
(c1) send a list of potential helpers to the help seeker client device;
(c2) receive from the help seeker client device a selection of one or more of the potential helpers on the list.

12. The medium of claim 10, wherein the match (b) comprises:
(b1) for each given potential helper, calculate a composite score according to the scoring model, wherein the scoring model comprises a weighted availability score representing the given potential helper's ability to help and a weighted helpfulness score representing the given potential helper's potential level of helpfulness; and
(b2) create the list of potential helpers according to the composite score of each given potential helper.

13. The medium of claim 12, wherein the availability score is weighted by one or more:
responses to previous help requests to the help seeker client device by the given potential helper; and
ranking of the given potential helper by other users of the help service, wherein the helpfulness score is weighted by one or more of types of requests the given potential helper previously responded to and satisfaction levels of past help seekers.

14. The medium of claim 12, wherein the availability score is further weighted by one or more of a distance between the help seeker client device's current location, a given potential helper client device's current location, and a time of day,
wherein the helpfulness score is further weighted by one or more of the following:
a given potential helper profile.

15. The medium of claim 12, wherein the scoring model further comprises a frequency score representing a frequency at which the given potential helper has responded to help requests, and a cost score representing estimated costs associated with obtaining help from the given potential helper.

16. The medium of claim 10, wherein the receive (a) comprises:
(a1) search a platform external to the help service for posts seeking help;
(a2) upon finding a post seeking help, import the post to the help service; and
(a3) create a second help request within the help service and associate the second help request with the imported post;
wherein the receive (d) further comprises:
(d1) receive from one or more potential helper client devices, a response to the second help request;
wherein the send (e) comprises:
(e1) send the response to the second help request to the post on the platform.

17. The medium of claim 10, wherein the match (b) comprises:
(b1) analyze text of the help request;
(b2) determine that the help request is a candidate for a sponsored answer;
(b3) determine a request type for the help request; and
(b4) match the request type with one or more specialists;
further comprising:
(f) route the help request to one or more specialist client devices;

(g) receive one or more answers to the help request from the one or more specialist client devices; and
(h) send the one or more answers to the help seeker client device.

18. The medium of claim 10 wherein the scoring model matches the one or more potential helpers based on at least one behavior associated with the one or more potential helpers, wherein the at least one behavior enables the one or more potential helpers to assist the help seeker with the help request.

19. A system, comprising:
a processor; and
a computer readable medium comprising computer readable program code embodied therein, wherein when executed by a processor causes the processor to:
(a) receive a help request from a help seeker client device, wherein the help seeker initiates the help request, wherein the help request is associated with a medical condition, and wherein the help request is related to a medical need and at least one of a) a demographic, b) a context, and c) a behavior;
(b) based on information in the help request, match the help request to one or more potential helpers of the help request using a scoring model, wherein the one or more potential helpers is comprised of peers of the help seeker who are associated with a similar medical condition as the medical condition that prompted the help seeker's help request;
(c) send the help request to each potential helper client device;
(d) receive server from one or more potential helper client devices, an indication of willingness to respond to the help request; and
(e) send to the help seeker client device information for responding to the one or more potential helper client devices from which the indication of willingness was received, to resolve the help request in a time frame required by the help seeker.

20. The system of claim 19, wherein the send (c) comprises:
(c1) send a list of potential helpers to the help seeker client device;
(c2) receive from the help seeker client device a selection of one or more of the potential helpers on the list.

21. The system of claim 19, wherein the receive (a) comprises:
(a1) search a platform external to the help service for posts seeking help;
(a2) upon finding a post seeking help, import the post to the help service; and
(a3) create a second help request within the help service and associate the second help request with the imported post;
wherein the receive (d) further comprises:
(d1) receive from one or more potential helper client devices, a response to the second help request;
wherein the send (e) comprises:
(e1) send the response to the second help request to the post on the platform.

22. The system of claim 19, wherein the match (b) comprises:
(b1) analyze text of the help request;
(b2) determine that the help request is a candidate for a sponsored answer;
(b3) determine a request type for the help request; and
(b4) match the request type with one or more specialists;
further comprising:

(f) route the help request to one or more specialist client devices;
(g) receive one or more answers to the help request from the one or more specialist client devices; and
(h) send the one or more answers to the help seeker client device.

\* \* \* \* \*